United States Patent [19]
Korsch

[11] 3,784,344
[45] Jan. 8, 1974

[54] MULTI-PART BLOW-MOLD FOR MAKING HOLLOW BODIES FROM THERMOPLASTIC MATERIAL

[75] Inventor: Günter Korsch, Berlin, Germany

[73] Assignee: Firma Emil Korsch Spezialfabrik Fur Komprimiermaschinen, Berlin, Germany

[22] Filed: Sept. 9, 1971

[21] Appl. No.: 179,006

[52] U.S. Cl.................. 425/387, 425/DIG. 208
[51] Int. Cl............................................. B29d 23/03
[58] Field of Search.................. 425/326 B, 324 B, 425/387 B, DIG. 58, 451, 342, 243, 249, 296, 297, 310, 4, 242–245, DIG. 208; 249/79

[56] References Cited
UNITED STATES PATENTS

| | | | |
|---|---|---|---|
| 3,704,081 | 11/1972 | Immel | 425/4 |
| 3,671,168 | 6/1972 | Nussbaum | 425/245 |
| 3,097,398 | 7/1963 | Inglesby | 425/387 |
| 3,048,891 | 3/1962 | Maass | 425/326 |
| 3,304,354 | 2/1967 | Hill et al. | 425/326 |

Primary Examiner—Robert D. Baldwin
Assistant Examiner—David S. Safran
Attorney—John J. McGlew et al.

[57] ABSTRACT

The parts of the blow-mold have cooling spaces for circulation of a coolant, and have a negative inner wall corresponding to the outer contours of the hollow body to be formed. Each blow-mold part includes a box-type metal body frame and a thin-walled insert presenting the negative contour, each insert being secured to the associated body frame and closing it off internally so that each insert and its associated body frame defines a respective cooling chamber of substantially the height of the insert. The inserts may be relatively thin sheet metal in which the contours are formed by cold working or cold shaping. The blow-mold has centering apertures, at each end, for a shoulder insert and a bottom insert both of which have recesses seating the sheet metal shell inserts. The cooling chamber is divided, for coolant circulation, by guide plates which are shorter than the height of the chamber and terminate alternately in engagement with the shoulder insert and with the bottom insert so that a zig-zag flow path is provided.

3 Claims, 2 Drawing Figures

MULTI-PART BLOW-MOLD FOR MAKING HOLLOW BODIES FROM THERMOPLASTIC MATERIAL

FIELD OF THE INVENTION

This invention relates to multi-part blow-molds for making hollow bodies from thermoplastic material and, more particularly, to a novel and improved blow-mold having a negative inner wall, corresponding to the outer contours of the hollow body to be formed, and which wall is formed by a thin-walled insert of sheet metal or the like.

BACKGROUND OF THE INVENTION

The mode of operation of blow-molds is dependent, to a large extent, with respect to the function and sequence of the cycles, on the nature of the installed blow-mold. The weight of the blow-mold, as well as the duration of the cooling process, plays an important part.

Up to the present, blow-molds have been made from steel ingots or castings, and the necessary cooling zones have been drilled as channels into the walls of the blow-molds, or have been cast thereinto. Such blow-molds are known, for example, from German Pat. Nos. 1,109,353 and 1,130,151. For rapid cooling of the fully shaped hollow body, the cooling channels are usually supplied with cold water or other coolant under pressure and having a forced flow. The coolant circulating in the channels accelerates the cooling and solidification of the fully shaped hollow body, which can be ejected only after a sufficiently long cooling process, by opening the blow-mold.

The cooling process therefore is a major factor in the cycle period or cycle time of blow machines. Instead of the cooling channels, blow-mold halves have been provided with cooling fins, such as shown, for example, in German Pat. No. 976,813. The shoulder parts and bottom parts of blow-molds are particularly subject to wear, and as shoulder and bottom insert parts are known in which, like the blow-mold, they are designed as halves. Coolant channels, again designed as bores, are provided in the insert parts, and cool the shoulder and neck portions as well as the bottom portion of the hollow body inflated in the mold, while the normally provided coolant channels cool the surface area of the hollow body. It is especially in this part of the blow-molds that cooling is usually insufficient for attaining a higher cycle rate.

Considerable expense is involved in keeping the coolant temperature at a minimum, so that the coolant therefore often has been precooled, to improve the cooling effect and to shorten the duration of the cooling process. These measures are expensive and have a cost-increasing effect. For the same reasons, the use of coolants having a particularly low initial temperature must be rejected, so that a readily available solution has not yet been found.

SUMMARY OF THE INVENTION

The invention is directed to a new and surprising solution to the problem of cooling also high performance blow-molds. In accordance with the invention, the blow-mold halves include a box-type metal body frame and a thin-walled insert presenting the contour, and this insert is secured to the metal body frame and closes it off on the inside or internally. A cooling chamber of approximately the height of the insert is enclosed by the metal body frame and the associated thin-walled insert. The insert is so thin that it may consist of a sheet metal shell, whose contours are produced by cold shaping of the sheet. Depending on the size of the blow-mold or of the hollow body to be formed, sheets of any desired thickness can be used, for example, sheets having a thickness of 0.5 mm or more. Furthermore, all grades of sheet metal may be used, such as steel sheet, Nirosta sheet, gold sheet, etc.

A surprising feature of the invention is that the relatively thin thickness of the material is sufficient to produce a negative inner wall of the blow-mold corresponding to the outer contours of the hollow body, and which has at least the same stability as the inner wall of a more solid blow-mold. The contours, produced in the sheet, and which correspond to those of the hollow body, have a stiffening effect on the mechanical strength and the form stability of the insert. Thus, there can now be used more wear-resistant surfaces than hitherto and, besides, the desired better cooling effect is obtained. The form-giving inner wall of the blow-mold is limited to a minimum of material, and the lesser mass of the insert no longer stores heat.

There thus occurs a permanent surface cooling of the entire insert or sheet metal shell of the blow-mold, with the result that the flow-mold continually receives new preforms in the cooled state, and an instanteous cooling, without waiting periods, occurs and time losses for the cooling process are eliminated. Thereby, an almost ideal method of cooling the blow-molding is attained. The faster cooling and the considerably reduced weight of the blow-mold result in the cycles succeeding each other more rapidly and, for a complete run from the blank to the finished hollow body, time savings of up to 50 percent are attained.

There is another advantage in that, due to the low weight of the blow-mold, the components present in the closing frame are stressed less, and thus there results a correspondingly longer life. Due to the fact that sheet metal inserts of the blow-molds, of material of higher hardness or even in the hardened state, can be installed, the dimensions of the moldings remain unchanged in long-term operation, and the quality of the molding is constant with respect to their surface quality and dimension. Further, the molds have a much longer useful life.

In addition, in view of their light weight, which permits savings up to 80 percent, the installation and disassembly of blow-molds embodying the invention can be effected effortlessly and in a much shorter time for the tool change. Lastly, due to the lower weight of the blow-molds, the closing frame can work at a higher speed.

Advantageously, the sheet metal shell half-parts have, in the separation joint of the mold halves, flange projections with apertures for fastening screws, so that the inserts thus can be exchanged. The advantage of this is that, for one mold size, usually one and the same box-type metal body frame can be used, in which various inserts having different contours can be secured. It may also be necessary to exchange the shoulder insert and the bottom insert for others, but this does not mean that the metal body frame also must be changed.

Advantageously, the metal body frame comprises, at both ends, a centering aperture for a shoulder insert and a bottom insert, respectively, which have internal recesses into which the sheet metal shell engages in a sealing manner. The recesses advantageously may be designed as centerings for the shells.

An advantageous feature resides in subdividing the cooling chamber, for the coolant circulation, by guide plates which are shorter than the cooling chamber and terminate approximately at the level of the shoulder insert and of the bottom insert, alternately, leaving free openings at the opposite ends of the plates for the coolant circulation. These openings thus are arranged alternately at the top and the bottom in the blow-mold, so that there results a circulation which extends both downwardly and upwardly through the cooling chamber of the blow-mold.

The guide plates may be inserted in longitudinal grooves of the metal body frame, and extend inwardly to the sheet metal shell which can be supported by these guide plates. In this way, the guide plates also serve as supports for the cooling wall insert of the blow-mold. Since the mold is divided, the guide plates can be firmly connected also with the sheet metal shell, for example, by soldering.

In conjunction with the guide plates acting as supports, it is possible to use sheet metal inserts of nearly any size for large blow-molds. The supports, in fact, also increase the form stability of the insert. For small inserts and correspondingly small cooling chambers, the number of supports may be reduced, if this is possible for reasons of form stability, or the supports or guide plates may be omitted altogether if the coolant circulation through the cooling chamber is not impaired thereby.

An object of the invention is to provide an improved blow-mold for making hollow bodies from thermoplastic material.

Another object of the invention is to provide such a blow-mold having greatly improved cooling characteristics.

A further object of the invention is to provide such a blow-mold having a longer useful life, which is lighter in weight, and which greatly increases the production rate of blown hollow bodies.

For an understanding of the principles of the invention, reference is made to the following description of a typical embodiment thereof as illustrated in the accompanying drawing.

DESCRIPTION OF THE PREFERRED EMBODIMENT

Figure 1:
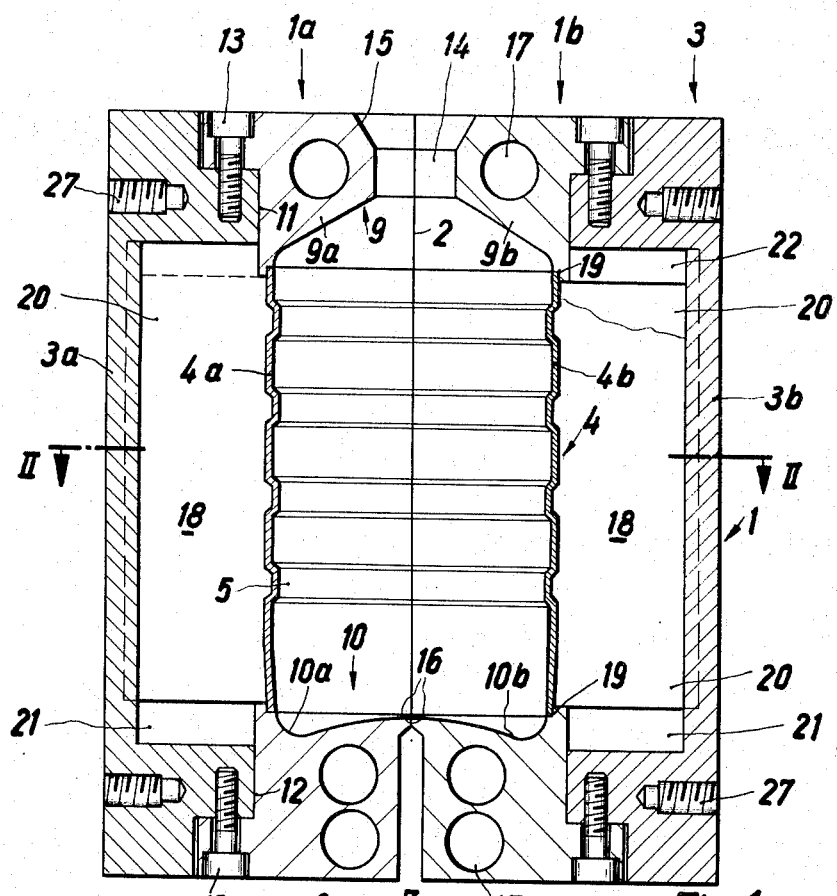
FIG. 1 is a longitudinal or axial sectional view through a closed blow-mold embodying the invention.
Figure 2:
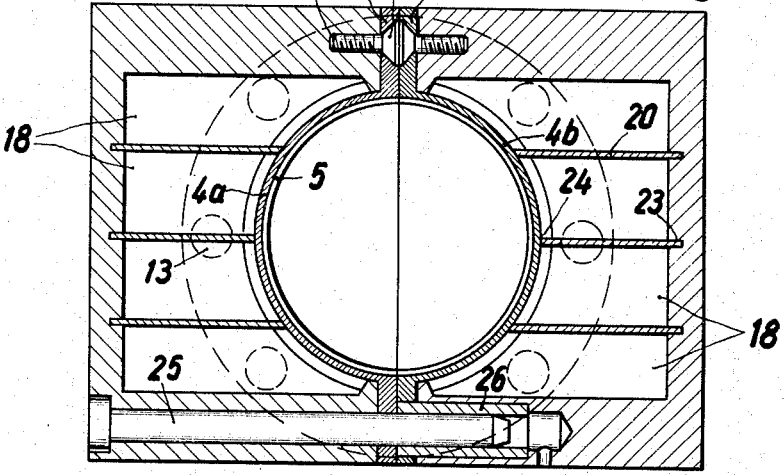
FIG. 2 is a transverse sectional view on the line II—II of FIG. 1.

A multi-part blow-mold 1, embodying the invention, and as illustrated by way of example in the drawing, comprises two blow-mold halves 1a and 1b which are shown in the closed state. The separation plane or joint is indicated at 2, and while the two halves are symmetrical, the invention is not limited to symmetrical molds. The blow-mold is designed in accordance with the configuration of the hollow body to be formed, so that, just like the hollow body, the blow-mold halves may be unsymmetrical. In any case, however, the closed blow-mold parts form a cavity with a negatve inner wall corresponding to the outer contours of the hollow body, and against which the usually tubular preform is inflated to the finished hollow body by a blowing mandrel enclosed therein.

Each of the blow-mold halves consists of a box-type metal body frame 3 and a thin-walled insert 4 having the contour of the hollow body, which has not been shown. The insert thus comprises two sheet metal shell half-parts 4a and 4b. The illustrated contours constitutes shallow grooves, which may be impressed into the sheet metal of the insert by cold shaping in a known manner. The contour is a sheet metal profile of uniform wall thickness, and the configuration of this profile may be any desired.

Each sheet metal shell insert 4a and 4b closes off the associated metal body frame 3a, 3b, respectively, on the inside or internally. The insert half-parts have, at the separation joint 2 of the mold halves, flange projections 6 with apertures 7 to receive fastening screws 8. The screws 8 serve to secure the insert halves interchangeably to the metal body frames 3a and 3b. The two flange projections, which are contiguous when the mold is closed, have sharp inner edges, so that no separation joint will show on the fully blown hollow body. It is therefore advisable to make the flange projections thicker than the main portion of each sheet metal shell of the insert.

At their opposite ends, the two half metal body frames 3a and 3b receive a shoulder insert 9, which is also split into two halves, and a bottom insert 10, also split into two halves. Inserts 9 and 10 have corresponding centering apertures 11 and 12. The two half-parts 9a and 9b of the shoulder insert, as well as the two half-parts 10a and 10b of the bottom insert, are secured by screws 13 to the respective metal body frames 3a and 3b. The shoulder insert 9 has a neck aperture 14 and a funnel-shaped cutout 15, the latter being provided for the waste gob. The bottom insert 10 has squeeze lips 16 at the separation joint, and both insert parts 9 and 10 have cooling bores or channels 17.

The actual large cooling chamber 18 is formed by the interior of each metal body frame as well as by the respective insert 4a, 4b closing off the interior. The two sheet metal shell half-parts are sealingly fastened in recesses 19 at the shoulder insert and at the bottom insert. For sealing purposes, a sealing compound or an adhesive may be used. Naturally, sheet metal shell half-parts 4a and 4b also may be soldered in place. Recesses 19 simultaneously serve to center the two sheet metal shell half-parts.

Cooling chamber 18 is subdivided, for coolant circulation, by several guide plates 20, which are shorter than the cooling chamber and are arranged staggered in height relative to each other. Thus, alternate guide plates terminate at the level of the shoulder insert, and intermediate guide plates terminate at the level of the bottom insert, leaving free openings 21 and 22 alternately at the top and at the bottom. These openings above the botton insert and below the shoulder insert are arranged alternately from one guide plate to the next guide plate, so that there results, in the adjacent subdivided cooling chambers, an ascending coolant circulation and a descending coolant circulation, respectively. Guide plates 20 are parallel to and spaced from each other, and are inserted in longitudinal grooves 23 of the metal body frame and extend inwardly to the sheet metal shell 4 which is supported on the inner ends of the guide plates. The guide plates may be firmly connected with the sheet metal shell by soldering at points 24.

The two mold halves fit exactly in the closed condition of the mold, and this position or condition is assured by a guide pin 25 and a guide bushing 26. For attaching the two mold halves to the machine plate of the closing frame of the blowing machine, the metal body frames 3a and 3b are provided with threaded apertures 27.

While a specific embodiment of the invention has been shown and described in detail to illustrate the application of the principles of the invention, it will be understood that the invention may be embodied otherwise without departing from such principles.

I claim:

1. In a multi-part blow-mold, for making hollow bodies from thermoplastic material, having cooling spaces arranged in the blow-mold parts, for circulation of a coolant, and having a negative innerwall corresponding to the outer contour of the hollow body to be formed, the improvement comprising, in combination, each blow-mold part including a box-type metal body frame, having relatively thick walls, and a thin-walled metal shell insert presenting the negative contour, the wall thickness of said insert being very substantially less than that of said body frame; each insert being secured to the associated body frame and closing it off internally; each insert and the associated body frame defining a respective cooling chamber of substantially the height of the insert; each insert consisting of a sheet metal shell; the metal body frame parts conjointly defining at respective opposite ends of the mold, a centering aperture for a shoulder insert and a centering aperture for a botton insert; a shoulder insert and a bottom insert inserted into each respective aperture; said shoulder insert and said bottom insert being formed with recesses in their inner surfaces in which the shell insert ends are sealingly engaged; guide plates dividing each cooling chamber for coolant circulation; said guide plates being shorter than the associated cooling chamber terminating, alternately, at substantially the level of said shoulder insert and at substantially the level of said bottom insert, whereby openings, for the coolant flow, are formed alternately adjacent the shoulder insert and the bottom insert; said guide plates being parallel to and spaced from each other and inserted in respective longitudinal grooves of each metal body frame, and extending inwardly to the associated thin walled metal shell insert and functioning as a support for the associated thin walled metal shell insert.

2. In a multi-part blow-mold, the improvement claimed in claim 1, in which said guide plates are fixedly connected with the associated sheet metal shell insert.

3. In a multi-part blow-mold, the improvement claimed in claim 2, in which said guide plates are soldered to the associated metal shell insert.

* * * * *